(12) United States Patent
Durham et al.

(10) Patent No.: US 6,853,110 B1
(45) Date of Patent: Feb. 8, 2005

(54) RADIAL FLUX DIODE MOTOR

(75) Inventors: Gary L. Durham, Wichita, KS (US); Harold Stephen Durham, Wichita, KS (US)

(73) Assignee: Tri-Seven Research, Inc., Wichita, KS (US)

( * ) Notice: Subject to any disclaimer, the term of this patent is extended or adjusted under 35 U.S.C. 154(b) by 0 days.

(21) Appl. No.: 10/202,434

(22) Filed: Jul. 24, 2002

Related U.S. Application Data

(63) Continuation-in-part of application No. 09/619,618, filed on Jul. 19, 2000, now Pat. No. 6,611,078.

(51) Int. Cl.[7] .................................................. H02K 1/12
(52) U.S. Cl. ...................................... 310/254; 310/49 R
(58) Field of Search ........................... 310/254, 154.01, 310/154.02, 154.28, 269, 49 R

(56) References Cited

U.S. PATENT DOCUMENTS 4,908,808 A * 3/1990 Knapen et al. ............. 368/157
6,133,664 A * 10/2000 Torok et al. ................ 310/181

* cited by examiner

*Primary Examiner*—Thanh Lam
(74) *Attorney, Agent, or Firm*—Young & Basile, P.C.

(57) ABSTRACT

The invention pertains to electrical machines of the electromagnetic type employing a stator and a rotatable such as electrical motors and generators, wherein magnetic forces imposed upon the rotor produce rotor rotation. Permanent magnets in either the stator or the rotor assembly are used to control the magnetic flux flow through the rotor in a radial direction, and the construction of the rotor and stator utilize poles which control the forces imposed upon the rotor such that the magnetic forces on the rotor primarily drive the rotor in its working direction, and counter-rotative forces which are common with conventional electrical machines are substantially eliminated by the utilization of flux directional control. Flux movement through the rotor is in a radial direction and high efficiencies and motor control are achieved.

15 Claims, 9 Drawing Sheets

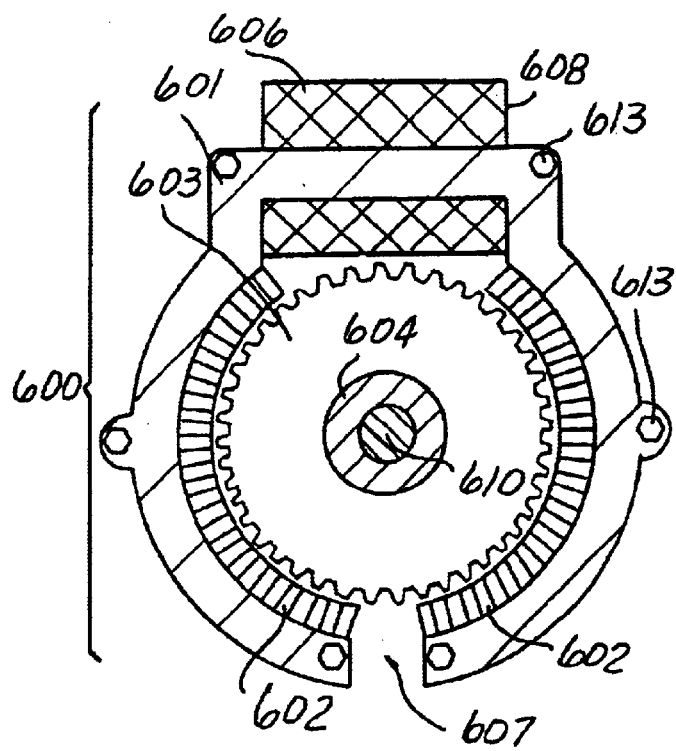 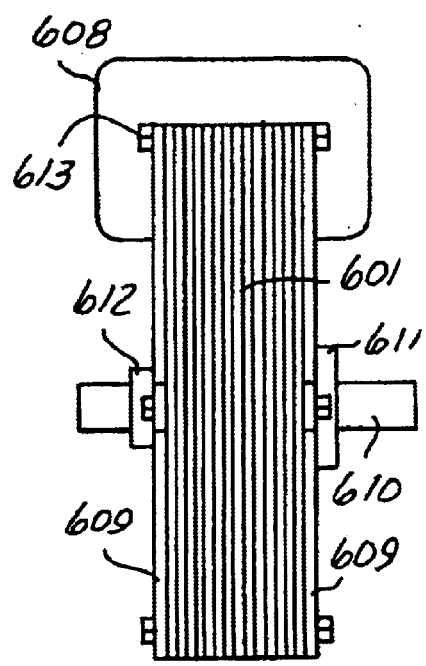
FIG. 1A
FIG. 1B
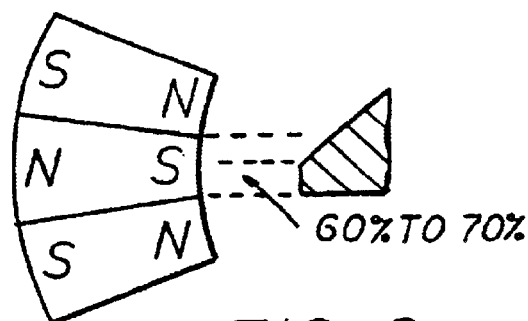
FIG. 2
  
FIG. 3A  FIG. 3B  FIG. 3C

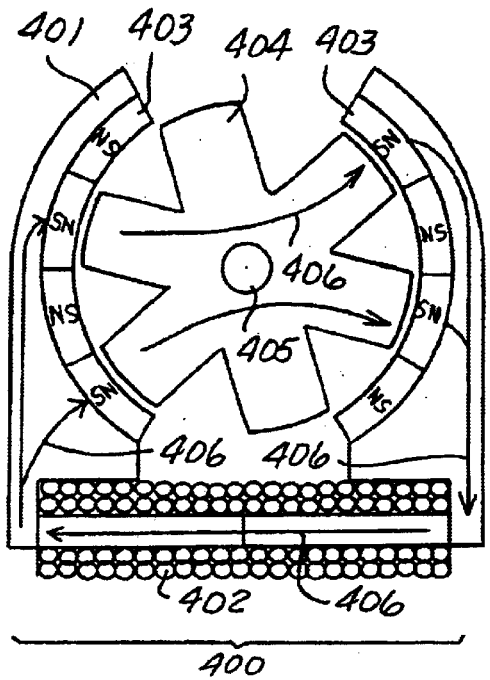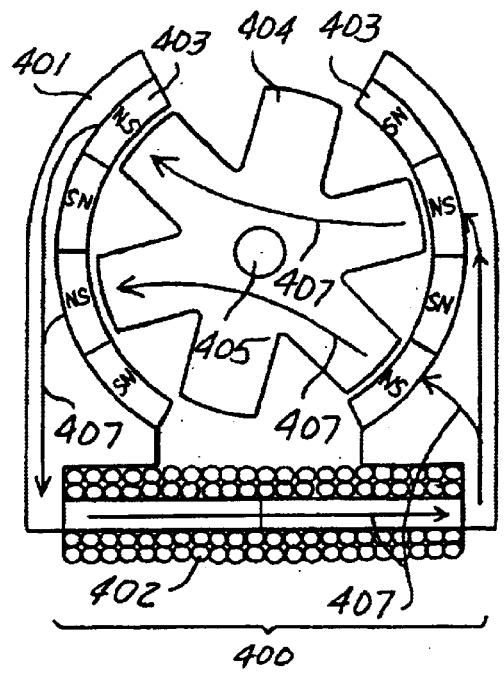
FIG. 6A   FIG. 6B
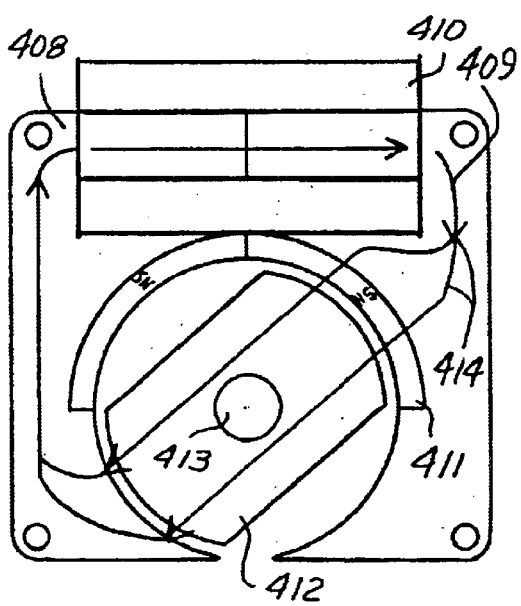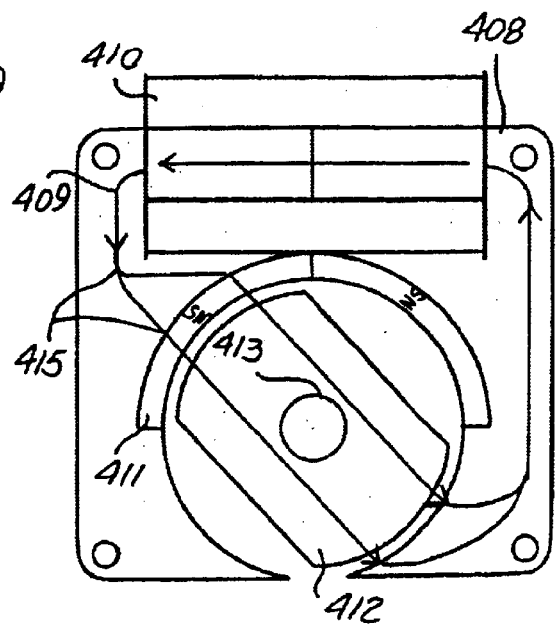
FIG. 7A   FIG. 7B

RADIAL FLUX DIODE MOTOR

RELATED APPLICATION

This application is a continuation-in-part of U.S. patent application Ser. No. 09/619,618 filed Jul. 19, 2000 now U.S. Pat. No. 6,611,078.

BACKGROUND OF THE INVENTION

1. Field of the Invention

The invention pertains to the use of magnets, preferably permanent magnets, to produce and control radial flux forces within the rotor of an electric motor or generator, wherein the motor forces are substantially radial, and counter-rotative forces are minimized.

2. Description of the Related Art

The related art has been discussed in the above-described application and the remarks under "Description of the Related Art" are herein incorporated.

While it is true that radial electromagnetic forces occur in present electric motors and generators, such electromagnetic forces producing the working direction rotation of the rotor must overcome counter-rotative forces imposed upon the rotor, and it is this balancing of working-rotative forces versus counter-rotative forces which decreases the efficiency of conventional rotating electric machines. The invention pertains to methods for reducing the counter-rotative forces imposed upon the rotor.

3. Object of the Invention

The basic object of the invention is to provide an electrical machine using a stator and rotating rotor wherein magnetic flux forces producing reverse electromotive forces are substantially eliminated or beneficially re-phased in a practical manner in a radial direction to significantly increase the efficiency of operation of the electrical machine, and permit the electrical machine to be manufactured by conventional techniques, and permit the electrical machine to withstand relatively high rotative forces and speeds without adverse influence.

SUMMARY OF THE INVENTION

The summary of this invention is similar, in many respects, to the "Summary of the Invention" of the continuation-in-part application Ser. No. 09/619,618, and the machine embodiments of the invention are properly also called a flux diode motor.

The machines of the instant invention distinguish from the electrical machines of the pending United States patent application mentioned above in that the electromagnetic forces of the instant machine are radial with respect to the axis of rotor rotation, as compared to the axial orientation of such electromagnetic forces as occur in the parent application.

In the previous application, the basic concepts of explanation of the operation of the flux diode motor are set forth, and the primary radial direction of the magnetic force of the instant invention permits a very practical and concise electrical machine to be constructed.

Of course, in the instant invention, the arrangement of the electrical machine components distinguish from those of the previously filed application in that the poles defined upon the rotor co-act with poles defined on the stator to control the electromagnetic force between the rotor and the stator to create a positive working force upon the rotor in the desired direction. An understanding of the operation of the invention as set forth in the above-identified application permits an understanding of the basic concepts of the instant invention even though the direction of magnetic forces in the parent application are primarily axial, while in the instant application, such forces are of a radial configuration with respect to the axis of rotor rotation.

The coil(s) in the motor system do not move in relation to the magnets used in the system exactly as in the original axial design. The magnets are used to alternately direct the flux created by the coil(s) to two different paths. In the process, the coil(s) flux which is alternately positive or negative, series with one set of magnets, then with the other set, each set being every other magnet around the work area. The set of magnets the coil(s) is magnetically in-phase with is the set it series with and the set it is magnetically out of phase with has its permanent magnet field collapsed back through the in-phase set. This creates a moving or spinning magnetic field with alternating polarity as each set of magnets of opposite polarity alternately series with the coil and manifest their combined flux in the work area between the stator and rotor poles.

BRIEF DESCRIPTION OF THE DRAWINGS

The objects and advantages of the invention will be appreciated from the following description and the accompanying drawings wherein:

FIG. 1 is a sectional schematic view constituting elevational sectional views taken at 90° with respect to each other of a simplified version of the electrical machine of the invention having a plurality of magnets disposed about the interior of the stator and pole faces are defined upon the rotor circumference;

FIG. 2 is a detailed schematic view of rotor pole faces and the relationship with the stator poles;

FIG. 3 illustrates three types of salient pole shapes as used with the rotor, the particular bow-shape having preferable features for various types of motor operation;

FIG. 6 illustrates a schematic elevational view of an electrical machine in accord with the inventive concepts illustrating magnetic force flow through the rotor at various stages of operation;

FIG. 7 is a schematic elevational view of another embodiment of the invention illustrating the magnetic flow through the electrical motor components wherein a four pole laminated stator is employed in conjunction with a two pole rotor;

DESCRIPTION OF THE PREFERRED EMBODIMENTS

Figure 4:
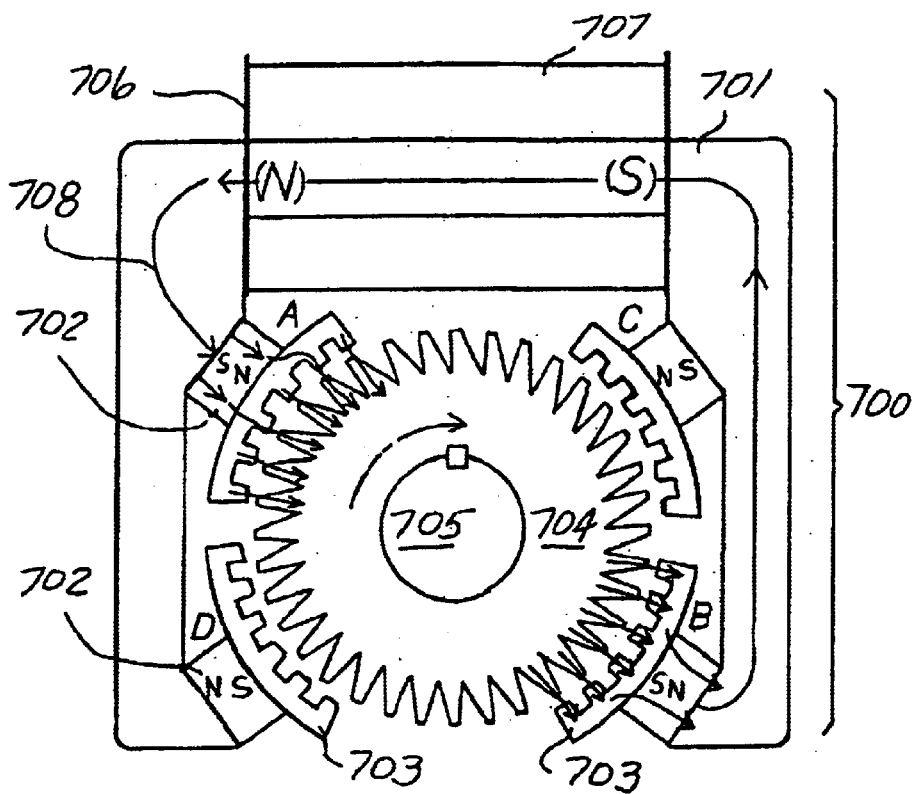
FIG. 4 is a schematic sectional view of a low RPM motor having a reduced magnet configuration during one phase of operation.

In U.S. patent application Ser. No. 09/619,618, filed Jul. 19, 2000, the principles of the flux diode torque system were disclosed, a new and novel means of creating torque in electric motors, in which the magnets and coils, used normally, do not move in relation to one another. Most of the embodiments disclosed in that application were of axial magnetic flux flow construction. This application, which is a continuation-in-part of the previous application, discloses new embodiments which apply the flux diode effect to radial magnetic flux flow configurations.

It will be appreciated that in most motor designs where magnets are utilized, the coils which create the flux in the system to provide torque and the magnets used are not both stationary. It is normal for either the magnets to be fixed, as in permanent magnet stator assemblies, and the coils to rotate, as in armature windings or, for the coils to be stationary, as in AC synchronous or brushless DC stators and the magnets to rotate, as in permanent magnet rotor assemblies used in these designs. In the flux diode torque system, it is normal for the magnets and the coils to both be stationary or both be rotary, or in other words, not to move in relation to each other. It was shown in the previous application mentioned above that this novel configuration has certain beneficial characteristics when properly designed. These characteristics range from increased simplicity of design and construction, to novel torque characteristics which provide before-unknown possibilities in design, to unique electromagnetic in-phase generations which, when properly managed, can increase efficiency. As will be shown in the following description, the flux diode system can also produce low RPM torque motors which need no gears and only one coil and has no need of starting coils or shaded poles.

The flux diode torque system disclosed in this application can be applied to produce AC synchronous, low RPM motors. The flux diode system when used in this configuration, makes it possible to produce low RPM, high torque motors which have outputs at the shaft like a gear motor but do not need the gears. The motors are synchronous with AC 110 volt current and with proper pole-width-to-circumference-ratios, they self-start, even under load, without any starting coils or circuit. In this self-starting characteristic, the flux diode low RPM motor has the convenience of a shaded pole AC motor but has much better efficiency in fractional horsepower applications.

In FIG. 1, a frontal and side view of such a motor is shown. Motor 600 is shown with stator laminations 601 bolted together with bolts 613 and with coil holder 608 with coil 606 wrapped within it. Stator laminations 601 have gap 607 at the bottom, opposite the coil to provide flux resistance between the two sides of the stator. If needed, a coated block of aluminum can be fitted into gap 607 to provide greater resistance to the 60 Hz field. Multi-pole magnet arcs 602 are shown bonded to the inside rotor area of stator laminations 601. The magnet arcs are identical and have an alternating pattern of North and South poles along both its inner and outer radii. The shaded areas represent one polarity, North inside and South outside, and the unshaded areas of the arc represent the opposite polarity, South inside and North outside.

It should be noted that in this design, it is best to have an even number of poles on each arc, half of one polarity and half of the other, in order to keep the torque smooth as the coil flux needs to shunt through equal numbers of rotor poles and stator magnet poles on each side. As can be seen from FIG. 1, this is achieved by having the arcs be identical and installed so that at the top, on either side of the coil 606, the first pole on each arc is North on the inside and South on the outside. Since there are an even number of poles on each arc, this dictates that at the bottom of the stator, on either side of the gap 607, both arcs will terminate with the opposite polarity—South inside and North outside—to what each began with at the top. The spacing between the two arcs at both the top of the stator where the coil 606 is wrapped, and the bottom of the stator, where gap 607 is such that an even number of magnet pole widths is left out at the top and at the bottom.

For example, in FIG. 1, the magnetic poles of the arcs are 4.5° apart, center-to-center. This means that eighty of them would fit around the entire inner radius of the stator if that radius were unbroken, which it is not. There is the width of sixteen magnet poles left out at the top and the width of four magnet poles left out at the bottom, leaving thirty magnet poles per side. Since the arcs are identical and are to be installed with the same beginning poles at the top and the same ending poles at the bottom, this results in the pattern of poles from side-to-side being shifted one pole in relation to each other so that the even number of poles on the rotor, which are set every 9°, center-to-center, will have their pole faces line up with North magnet poles on one arc, on one side and South magnet poles on the other arc on the other side.

Thus, when coil 606 has current going through it in the positive direction, it will cause the flux exiting the coil to travel down the laminations of stator 601 and enter the magnet arc on that side at the poles which have their South face toward the stator and their North face toward the rotor. This will pull the salient poles on that side of the rotor 603 into alignment with the North faces of these magnet poles and the flux will pass through the rotor 603 to the other side of the stator. On the other side, this causes the salient poles of the rotor 603 to line up with the poles of the arc which have their South face toward the rotor and their North face toward the stator. This allows the flux to pass into and through these magnet poles into the laminations of stator 601 and back to coil 606.

When current passes through coil 606 in the negative direction, it will cause the flux to exit the coil in the opposite direction from the positive phase. The flux will travel down the laminations of stator 601 and enter the magnet arc on that side at the poles which have their South face toward the stator and their North face toward the rotor. This will pull the salient poles on that side of the rotor 603 into alignment with the North faces of these poles and the flux will pass through the rotor 603 to the other side of the stator. On the other side, this causes the salient poles of the rotor to line up with the poles of the arc which have their South face toward the rotor and their North face toward the stator. This allows the flux to pass into and through these poles, into the laminations of stator 601 and back to coil 606. As the AC current repeats this ad infinitum, rotation is caused on the rotor 603 which is mounted on center hub 604 (which is either coated aluminum or plastic) in which shaft 610 is fixed. Shaft 610 is held by bearing 611 and one-way roller bearing (clutch bearing) 612, both of which are mounted in one of the end plates 609.

Because of the one-way roller bearing 612, the rotor can only rotate in one direction, causing the rotor to always start in the same direction when power is applied to the rotor. It is also possible to put a bearing 611 in place of the one-way bearing 612 and then mount two one-way bearings 612 to the shaft either both on one side or one on each side. The one-way bearings 612 are placed on the shaft so that they each refuse rotation in the direction opposite of the other. The outsides of these one-way bearings are each then fitted into their own clutch-type housing which is either operated by solenoid or mechanically. When the outer clutches are not engaged, the rotor can turn either direction as the roller bearing's outer rims can freely turn. But if one clutch is engaged holding the outer rim of that one one-way roller bearing, then the shaft can only turn in the direction allowed by that bearing. If the opposite one is engaged, the motor will start in the opposite direction. If these clutches are alternately and momentarily engaged while the motor is already running, they will cause the motor to immediately change direction and rotate in the opposite direction each time the alternate clutch is momentarily engaged.

By use of the one-way bearing without any circuit, the motor can be made sure in its direction of start or by the use of manually or automatically operated, twin-opposing, one-way bearing, it can become a reversing motor.

It is desirable to proportion the rotor poles of rotor 603 so that they are about 60%–70% of the arc magnet pole faces with which they interact. This is in order to minimize the dominates of either the side-to-side shunting of adjacent poles on the same arc magnet or the shunting across from arc-to-arc through the rotor. If the rotor pole is too wide, it will cause adjacent shunting of poles on the same arc to be dominate. This tends to lock up the rotor when a rotor pole passes between two magnet poles. This makes it very hard to start and reduces the output torque to the shaft. If the rotor pole is too narrow, it tends to cause the shunting between the arcs through the rotor to become dominate. While this will not hinder starting as much as in the opposite condition, it is none the less not as effective for starting or for efficient torque. The best condition is when the two shunting effects are balanced so that neither is predominate. This can be achieved by sizing the pole face of the rotor poles somewhat smaller than the pole face of the magnets. This usually falls somewhere between 60%–70% of the magnet face width for the rotor pole face width, but may vary according to design needs. This is illustrated In FIG. 2.

In FIG. 3, alternate salient pole shapes are shown for the poles of rotor 603. A of FIG. 3 shows the shape of pole used for a motor where the rotor is always to run in only one direction. The slope on the one side biases the rotor to start in that direction and gives it better mechanical torque. B is a shape which works well for a motor whose rotor is to be reversed. C can be used with any of the motors if properly sized to create permanent magnet shunting neutrality.

The number of poles designed into the stator and rotor determines the RPM of the motor if it is to be operated on 60 Hz current. The motor in FIG. 1 has an RPM of 90 at 60 Hz due to an inside magnet arc radius and magnet pole width equal to eighty stator poles in 360° and forty rotor poles. Greater numbers of poles make for slower RPM's and more torque, and lesser numbers of poles make for faster RPM's.

Figure 5:
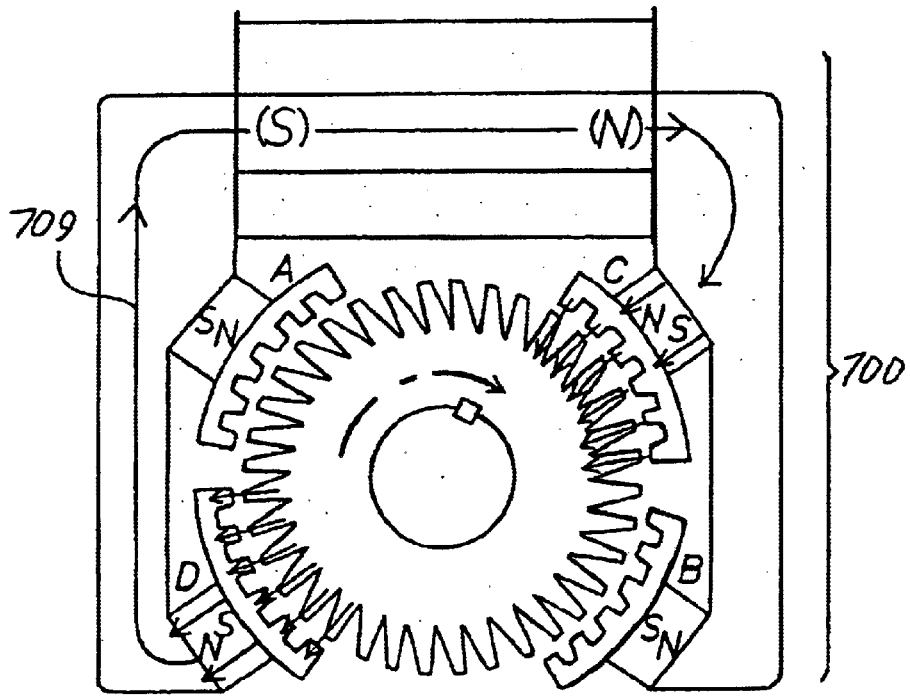
FIG. 5 is a view similar to FIG. 4 illustrating the flow of magnetic forces through the stator and rotator approximately 90° different from the relationship shown in FIG. 4.

Another low RPM design which utilized the flux diode motor torque system is the reduced magnet configuration. This design makes it possible to get the same low RPM and torque characteristics with less magnets used in the stator, as shown in FIG. 4. Motor 700 has laminated stator 701 which has magnets and pole assemblies A, B, C, and D, as shown. Each pole assembly is made of one of the magnets 702 and multiple laminated poles 703 which are affixed to the inside pole face of each magnet 702, toward the rotor area, with the multiple poles of 703 facing the rotor area. Stator 701 has coil holder 706 with coil 707 wrapped on it as shown in FIG. 4. Rotor 704, which is affixed to shaft 705, has multiple poles which spacing is such that they will line up with the spacing of the poles on the stator pole assemblies A, B, C and D. The stator pole assemblies are positioned so that when poles of rotor 704 rotate into alignment with the poles of stator pole assemblies A and B, as shown in FIG. 4, the poles of rotor 704 are not in alignment with the poles of stator pole assemblies C & D, as shown in FIG. 4. When the poles of rotor 704 are rotated into alignment with the poles of the stator pole assemblies C and D, the poles of rotor 704 are not in alignment then with the poles of stator pole assemblies A and B, as shown in FIG. 5. Arrows 708, as shown in FIG. 4, illustrate the approximate path which the flux from coil 707 will take through the stator 701, stator pole assemblies A and B and rotor 704, when current is applied in one direction. Arrows 709, as shown in FIG. 5, illustrate the approximate path which the flux from coil 707 will take through the stator 701, stator pole assemblies C and D and rotor 704, when current is applied in the opposite direction from that shown in FIG. 4. As the current is alternated in coil 707, the two different paths of the flux cause the poles of rotor 704 to rotate into alignment alternately with stator pole assemblies A and B and C and D, as illustrated in FIGS. 4 and 5. Because of the flux diode effect of the magnets, the alternating flux from coil 707 is always repelled by the out-of-phase set of stator pole assemblies and attracted by the in-phase stator pole assemblies. Thus, the flux diode effect causes torque on rotor 704.

The flux diode effect as disclosed in U.S. patent application Ser. No. 09/619,618 can be applied to several radial designs which are more conventional in appearance. The application of the flux diode effect to these designs actually changes them into a totally different system which operates by means of the flux diode effect for magnetomechanical torque and not by whatever the former system by which torque was achieved. This means that these applications only appear more conventional because they use standard type laminations in the stators and more conventional rotor designs. But they are, in reality, totally new motors which use the flux diode principle for torque production and would come under the claims of this application.

In FIGS. 6–13, several examples of the flux diode effect applied to embodiments which use more traditional laminations and rotor designs are shown. FIG. 6 illustrates motor 400 with laminated stator stacks 401, which form the core of stator coil 402, and the flux carrying paths between the coil 402 and the flux diode stator magnet arcs 403 and laminated motor rotor 404 on shaft 405. The rotor is of a salient pole design which is common in variable reluctance motors (VR), sometimes called, "cog motors." The magnet arcs 403 are each 120° segments of the total rotational area and have alternating poles every 30°. Each arc has a gap between its ends and the opposite arc which is 60°, or two magnet pole sections of the rotational area in size. The magnet poles do not continue the alternation pattern by space across the gaps but always begin the pattern again with the same pole orientation which was last on the opposite arc, thus insuring that oppositely oriented poles of the magnet arcs will always be 180° opposite each other on the outside of the rotor rotational area. Between the two arcs 403, there are eight 30° poles placed opposite one another on a twelve-pole possible diameter, thus leaving a 60° space between the ends of each arc. The rotor with its six salient poles is placed in the air gap between the arcs and is held in place by the shaft 405 which is held by end-plates and bearings or bushings (not shown).

In FIG. 6, the left hand version of the motor shows the first phase as the stator coil 402, sends flux, indicated by arrows 406, through the stator laminations in the direction indicated. The magnet poles in each arc on each side of the stator which are oriented S-N, from left to right, are in-phase and receive the flux 406 while the magnet poles in each arc on each side of the stator which are oriented N-S, from left to right, are out-of-phase and reject the coil flux 406. This results in four of the rotor poles being torqued into alignment with the in-phase poles causing rotation. In the right hand version, the second phase is shown where stator coil 402 reverses its current and thus its applied flux to the motor stator 401. Thus, the oppositely oriented flux 407 passes through the stator and is received by the in-phase poles which are oriented N-S, from left to right, in each stator magnet arc and are rejected by the out-of-phase poles in each stator magnet arc which are oriented S-N, from left to right. Since the opposite set of poles is now the in-phase path for flux 407, the poles of the rotor are torqued into alignment with these and further rotation is caused. These phases continue in alternation causing continued rotation of the rotor and giving useful torque at the shaft.

In FIG. 7, a similar motor 408 is shown where a four pole laminated stator 409 is used and a two pole rotor 412. However, magnets 411 are needed on only two of the stator poles to create the flux diode effect. The other two poles are normal metal laminated poles, but they will only interact with the rotor through a pole which does have a magnet for the flux diode effect and is 180° opposite to it on the stator air gap. As can be seen in the left hand portion of FIG. 7, when the stator coil 410 applies flux in the direction indicated by arrows 414, the magnet 411, which is at the top near the coil on the right side of the motor, has its South face toward the North end of the coil 410 where the flux is existing from the coil, and is therefore in-phase with the coil flux and will "attract" the flux from coil 410. This will cause the rotor 412 to be torqued into alignment with this in-phase magnet and the metal pole which is opposite it and thus provides a flux path back to the other end of coil 410. And since the other magnet pole on the left side of the motor will not allow the flux 414 to pass through it in this direction (it is out-of-phase), then this further helps concentrate the flux 414 into the other magnet and its opposite metal pole.

When the coil 410 has its field reversed, the flux 415 will then exit the left end of coil 410 as shown in the right hand portion of FIG. 7. The other magnet pole which is at the top left of the motor and has its South face toward the now North end of the coil 410 where the flux 415 is exiting from the coil 410 is now in-phase with the flux 415 and will "attract" it through itself. This will result in the rotor 412 being torqued into alignment with this magnet pole and its opposite metal pole which provides a flux path back to the other end of coil 410. And since the other magnet on the right side of the motor will not allow the flux 415 to pass through it in this direction (it is out-of-phase), this further helps concentrate the flux 415 into the other magnet and its opposite metal pole.

Figure 8A:
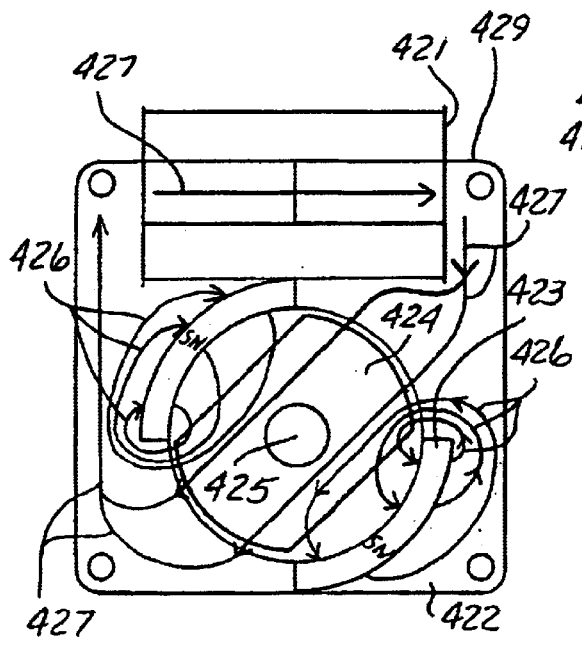
FIG. 8 illustrates two schematic elevational views of a pulse DC version of an electrical machine in accord with the invention, the rotor being disposed substantially 90° with respect to each other.
Figure 8B:
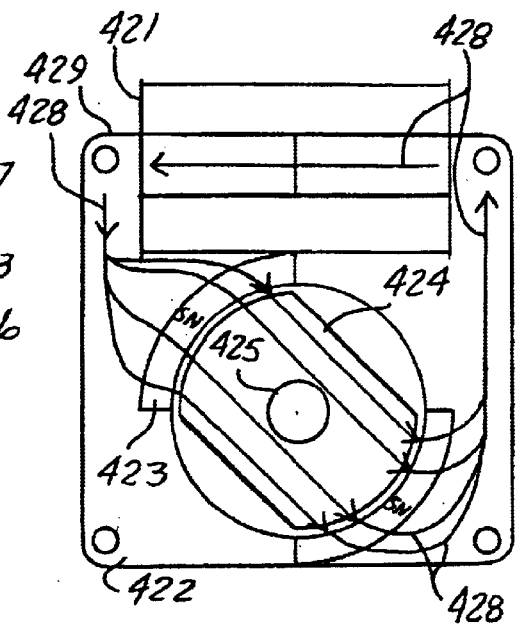

In FIG. 8, a pulse DC version of this motor 420 is shown. Here, the magnets 423 are placed opposite of each other and in-phase with each other. They are used during the "on" phase, when coil 421 has voltage and current applied to it, to reject the flux 427 which comes from the coil 421 and thus concentrate the flux 427 in the two metal poles which are opposite each other. This causes the rotor 424 to be torqued into alignment with the two metal poles in order to provide a shunted path for the coil flux 427 and thus causes rotor rotation. This is illustrated on the left hand side of FIG. 8 where the flux from the magnets 423 in stator laminations 422 is indicated by the lines and arrows 426. During this phase, the magnets 423 un-series their flux from each other and each shunts back to itself through the metal poles and the rotor 424 because they are out-of-phase with the direction of flux flow 427 in the core of the coil and cannot shunt to each other through it.

When the coil 421 is turned "off", then the flux 428 from the permanent magnets, as seen in the right hand portion of FIG. 8, causes the two magnets to shunt to each other because they are in-phase with each other. They do this by reversing the magnetic orientation of the laminated core in coil 421, which is part of the stator 422, and by torquing rotor 424 into alignment with themselves causing rotor rotation. These two phases are repeated one after the other in proper timing to create a true DC motor, where there is no reversing current ever applied to the motor coil as is true of commutated DC motors where the current is reversed in the various coils by the commutation. This makes for a very simple form of pulse DC timing to control the motor phases.

Figure 9A:
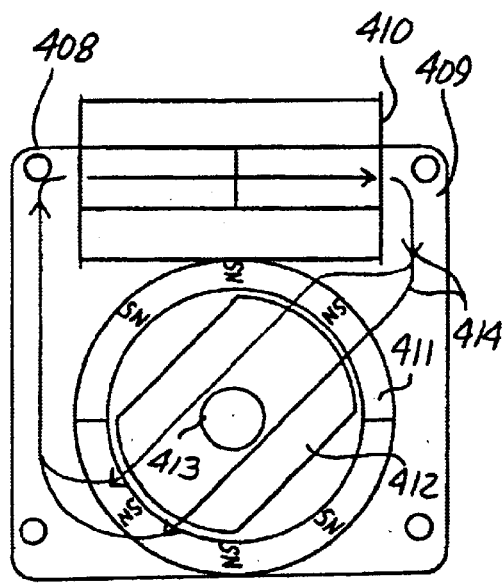
FIG. 9 illustrates two views of an electric machine utilizing axial electromagnetic flux forces wherein magnets are used at all of the poles to enhance the flux diode effect.
Figure 9B:
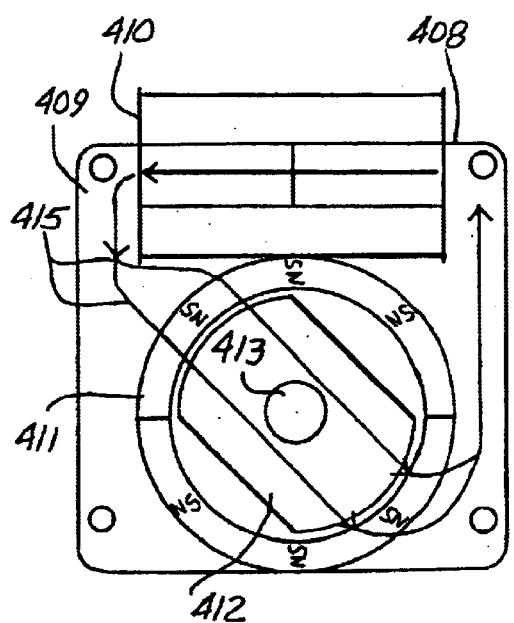

In FIG. 9, motor 408 is illustrated which is much like the motor in FIG. 7, except that it uses magnets for all the poles to further enhance the flux diode effect.

Figure 10:
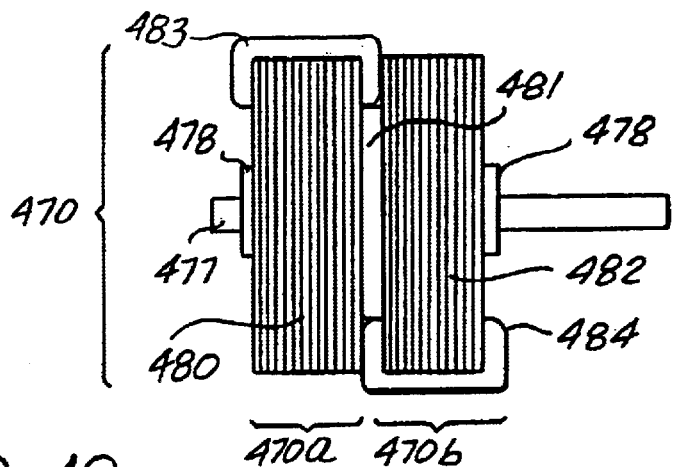
FIG. 10 illustrates a two rotor stepper motor using the flux diode principle.
Figure 10A:
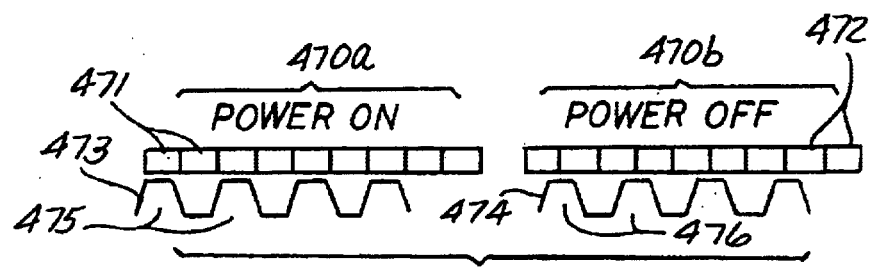
Figure 10B:
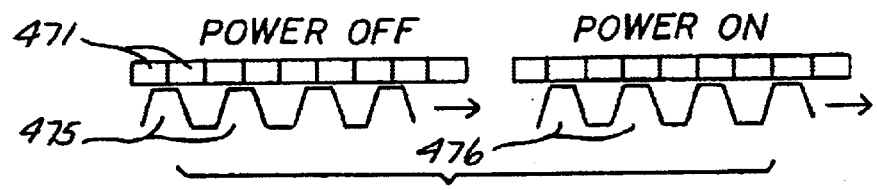
Figure 10C:
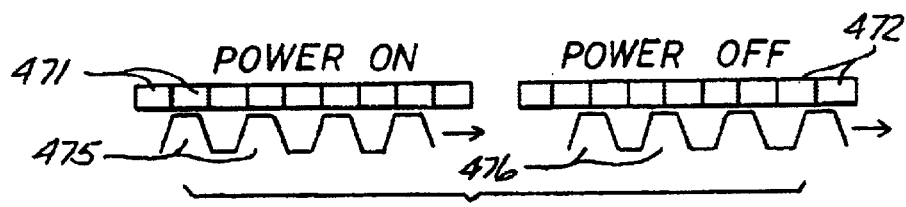
Figure 10D:
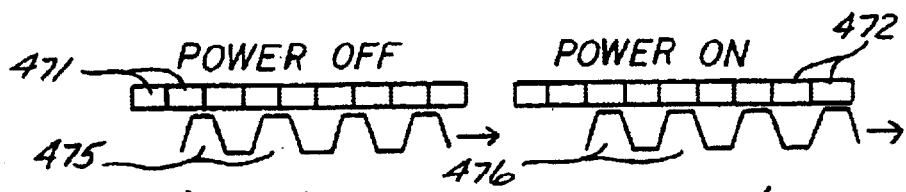

FIG. 10 illustrates a two rotor stepper motor 470 using the flux diode principle. This is like two radial flux diode motors as illustrated in FIG. 1, placed with their rotors on the same shaft 477, each rotor inside its own stator 480 or 482, each stator having its own stator coil, coil 483 for stator 480 and coil 484 for stator 482. The stators are separated by a nonmagnetic spacer 481 which has a center hole to allow shaft 477 to pass through. The rotors (not shown in top drawing of FIG. 10 with their poles as illustrated in FIG. 1, 603) have their poles sized so they will normally tend to set between two magnet poles due to adjacent magnetic shunting between oppositely oriented side-by-side magnet poles through the rotor poles; this position is like a magnetic default position which the stator magnets always try to maintain unless acted on by the stator coils. However, as can be seen in Phase One of FIG. 10, the rotor 471 with its poles 475 and rotor 472 with its poles 476 are pressed on the shaft so that one rotor is advanced one-half (½) stator magnet pole in rotational position to the other rotor and its poles and thus, it is not possible for both of them to rest at the "between the poles" position at the same time. If one rotor has its poles positioned at the center of every other stator magnet pole, then the other will be position between (straddling) its stator magnet poles or both rotors in some off-setting compromise thereof. Thus, as shown in Phase One of FIG. 10, when rotor 473 with poles 475 is positioned in its rotation where its poles are centered over every other magnet pole of stator magnet 471, then the other rotor 474, with poles 476 will be positioned in its rotation between (straddling) the poles of stator magnet 472. As is illustrated in Phase One of FIG. 10, when the stator coil 483 of stator 480 has voltage and current applied across it in the positive (+) direction, then the poles 475 of rotor 473 are torqued to the middle of the magnetically in-phase poles of stator magnet 471. At the same time, stator coil 484 of stator 482 is "off" and this allows the stator magnet poles of stator magnet 472 to torque the poles 476 of rotor 474 into the "default" position between (straddling)

the magnet poles of stator magnet 472. This is due to adjacent shunting of the stator magnet poles of stator magnet 472. In Phase Two, stator coil 483 of stator 480 is turned "off" and voltage and current is applied across stator coil 484 of stator 482 in the positive (+) direction. This causes rotor poles 476 of rotor 474 to be torqued ahead to the center of the in-phase poles of stator magnet 472. At the same time, the magnet poles of stator magnet 471 return to adjacent shunting and torque the rotor poles 475 of rotor 473 forward to the "default" position between (straddling) the poles it previously centered on and the next magnet poles in the advance direction of rotation. These two phases are then repeated in a like manner in Phases Three and Four, with the exception that the voltage and current applied across the stator coils alternately is in the negative (−) direction, in order to continue the torque as illustrated in Phase Three and Phase Four.

With two flux diode units like above, integrated onto a single shaft as a single motor as described above, if each has stator magnet poles equal in width to one-eightieth (1/80) of the rotor rotational area in each unit, with the rotors off-set from each other one-half (½) pole width as described above, 160 steps of 2.25° per step is achieved in a single revolution. The triggering and direction of rotation can be controlled with stepper motor circuits now in common use. However, because the flux diode motor design makes it unnecessary to use high frequency pulse-width modulation within the various applied voltage waves, and thus, frequency filtering is not needed to reduce or cancel the RF factors, it makes it possible to use much less expensive drivers than normally needed. (This is true of all the flux diode motor designs disclosed but a primary factor in the high frequencies used in stepper designs). This is due to the fact that the flux diode design causes the current to be "smoothed" and encouraged toward a sinusoidal waveform, even when the applied voltage is a square wave, due to the influence of the inherent re-phasing of generated forward and reverse electromotive voltages and currents within the stator coils as previously described in the U.S. patent application Ser. No. 09/619,618 filed Jul. 19, 2000.

Figure 11:
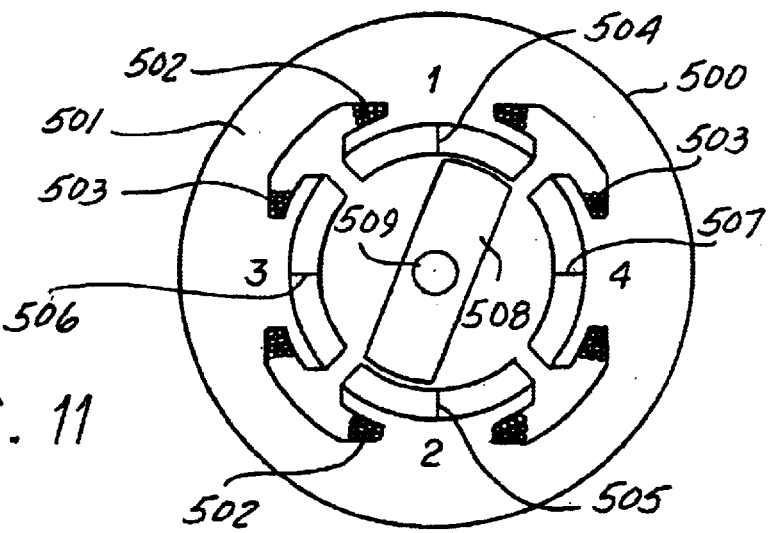
FIG. 11 illustrates five views of a single rotor stepper motor during various stages of operation.
Figure 11A:
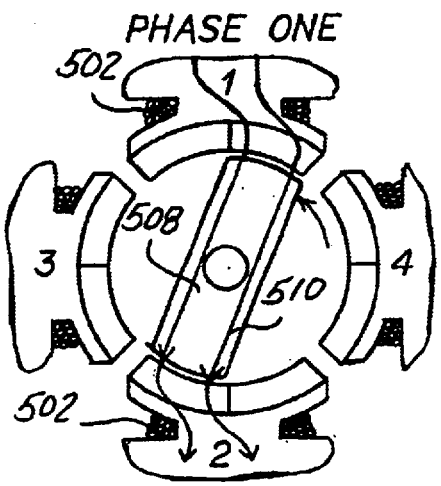
Figure 11B:
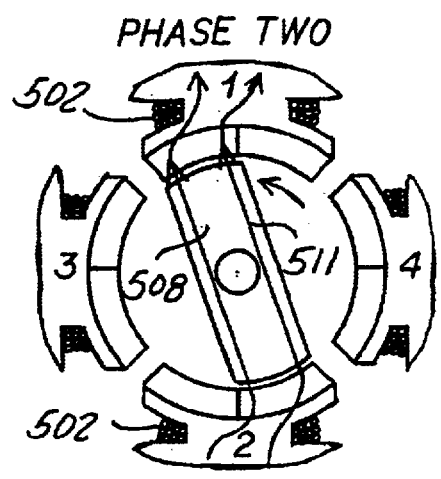
Figure 11C:
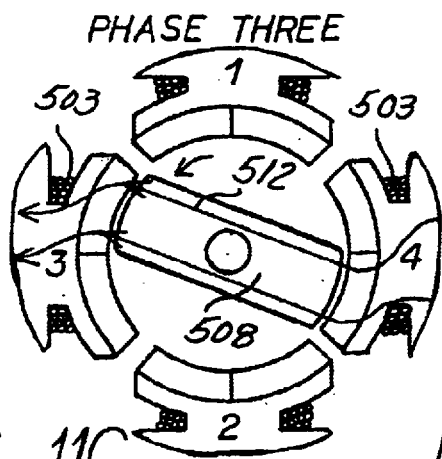
Figure 11D:
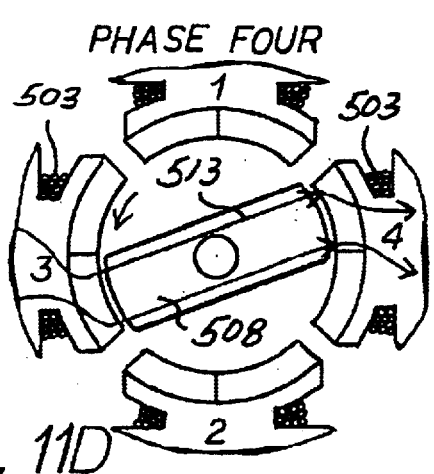

In FIG. 11, a single rotor stepper motor 500, which uses the flux diode system for torque and control is illustrated. This motor uses a common laminated four pole stator 501 and then places the magnet arcs 504, 505, 506 and 507 to be used a flux diodes on the respective pole faces of the stator as illustrated in FIG. 11. Each magnet arc has two oppositely oriented magnetic poles and thus makes each stator pole into two magnetic poles. The arcs are placed on the stator poles so there will always be an in-phase magnetic pole of an arc magnet 180° across the rotor area from every magnetic pole of any other arc magnet. This, of course, means that the alternating pattern of S, N, S, N on the inside face of the magnet poles is consistent for only two stator poles, such as poles 1 and 4 in a clockwise direction, and then is interrupted between stator poles 4 and 2 and then the opposite alternating pattern is begun, N, S, N, S, in a clockwise direction for stator poles 2 and 3. In Phase One of FIG. 11, the coils 502 of opposite stator poles 1 and 2 are turned "on" and the flux is established in the stator and the rotor as shown. As can be appreciated from the drawing, the flux can only pass through the right hand magnetic pole of the arc of stator pole 1 and only enter the face of the left hand magnetic pole of the arc on stator pole 2. This causes laminated rotor 508 to be torqued into alignment with these magnetic poles. In Phase Two, the current in the coils 502 is reversed and the flux then is directed by the magnets to the opposite magnetic poles and the rotor 508 is torqued in a counter-clockwise direction into alignment with these magnetic poles. It can be seen that the same procedure is used in Phase Three and Phase Four with respect to stator poles 3 and 4.

Figure 12:
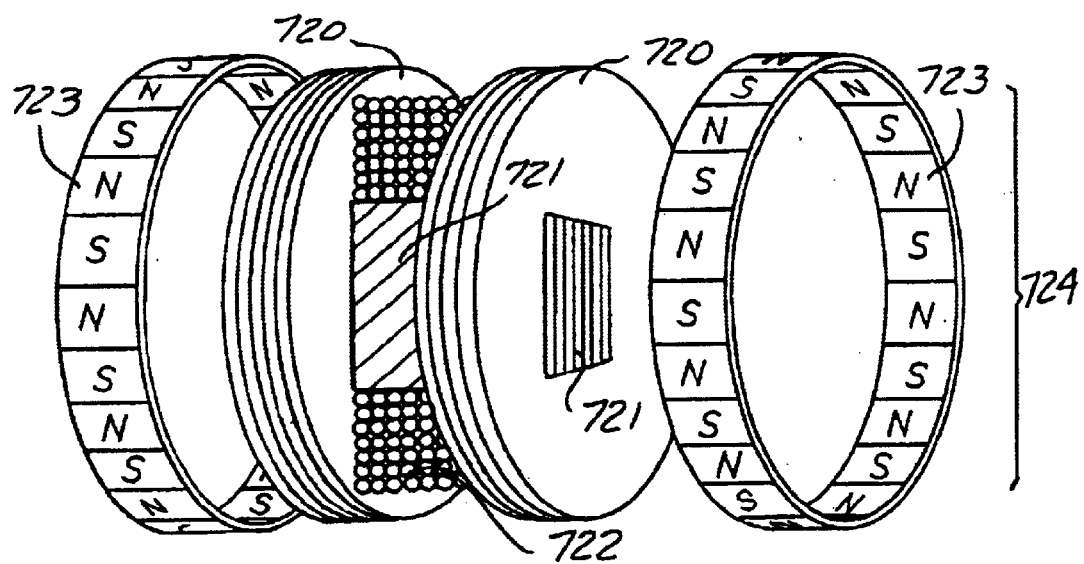
FIGS. 12–15 represent exploded and perspective views of a motor similar to that shown in FIG. 1 but having a reversal of stator and rotor position.
Figure 13:
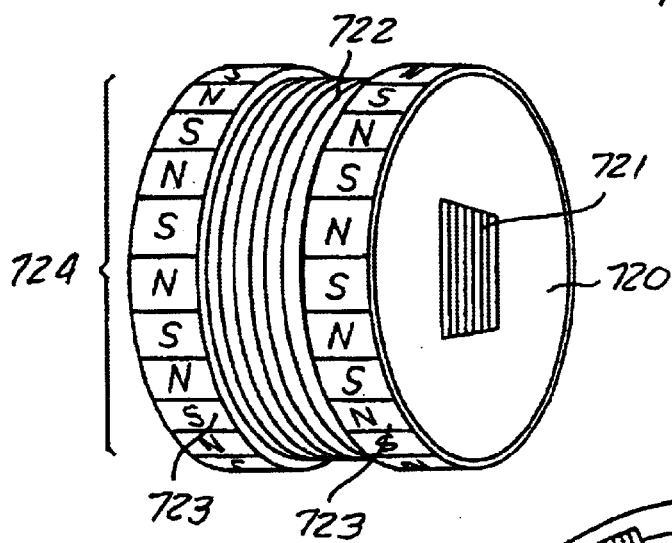

In FIGS. 12–15, a version of the flux diode motor is shown which would be similar to the flux diode motor in FIG. 1, but with a reversal of stator and rotor positions in the design. In FIG. 12, an exploded view of stator assembly 724 is shown. The stator has laminated pole disks 720 which have a square center hole and which are fastened securely to either end of laminated stator core 721 on which is wound stator coil 722, which is shown in FIG. 12 as a cut-away in order to show stator core 721. Multiplied radially oriented magnet rings 723 have an inside diameter which fits securely over the laminated stator disk 720 to which they are then bonded. FIG. 13 shows the assembled stator with the radial magnets so bonded in place that each North pole on the outside of the radial magnet is axially opposite a South pole on the other radial magnet and every South pole is axially opposite a North pole on the other radial magnet.

Figure 14:
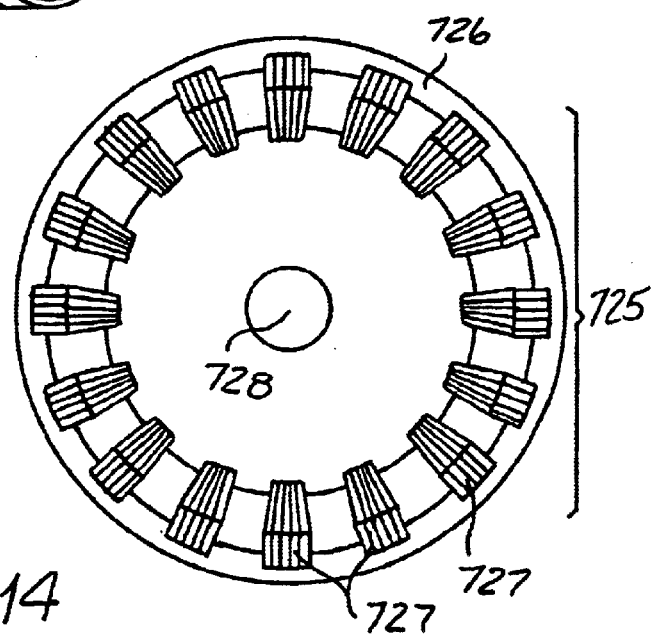
Figure 15:
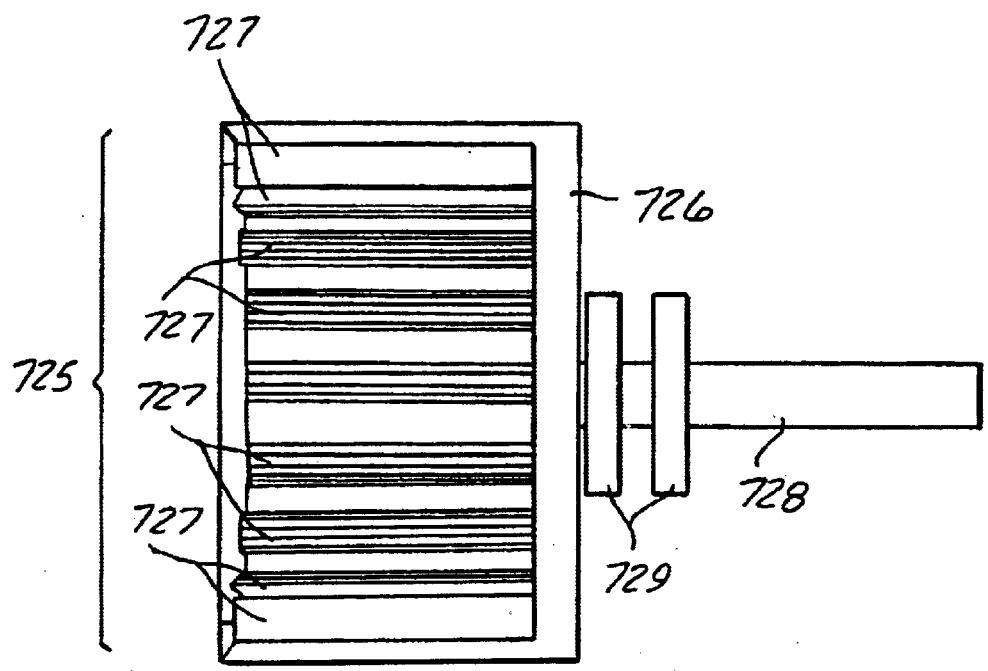

FIGS. 14 and 15 show end and side views of the rotor assembly 725 which fits over the stator assembly 724. The rotor assembly 725 has rotor housing 726 which can be made of a suitable plastic and has laminated rotor shunts (poles) 727 bonded in place on the inside circumference of the housing 726 equal distance from one another and spaced so as to align with every other magnetic pole on both of the stator magnet radial rings 723. The rotor housing assembly is securely mounted to shaft 728 so as to be able to rotate on-center. The shaft 728 is secured by friction bearings 729 which are mounted in an outer motor housing (not shown). On the opposite side from the shaft, the stator assembly fits up into the rotor assembly with radial clearance between the magnet rings 723 and the laminated shunts 727 so as to allow the rotor housing 725 and shaft 728 to turn freely within bearings 729. The exposed side of stator 724 which would be seen from the opening in rotor assembly 725 has threaded bolt holes in the laminated stator disk 720 so as to allow the stator assembly to be mounted securely to the outer housing (not shown) which bearings 729 are also mounted onto the opposite side of the said housing. This mounting will keep the stator assembly in place and keep it from rotating.

Torque is caused in the same manner as described in previous flux diode motor descriptions. As voltage is applied to the stator coil 722, current in the coil 722 causes flux to concentrate in the laminated stator core 721 and the laminated stator disks 720. The flux then exits through the in-phase magnetic poles (South on inside and North on outside) on one of the radial ring magnets 723. It then rotates the rotor shunts 727 into alignment with these magnetic poles. The flux then completes the circuit by returning to the coil core 721 by entering the in-phase magnetic poles (South on the outside and North on the inside) on the opposite ring magnet, which are also mechanically in alignment with the in-phase magnetic poles on the first ring magnet, and then back through the laminated disk on which the return magnet is mounted. When the voltage is reversed in the stator coil 722, the current causes the flux to reverse directions and the opposite set of magnetically oriented poles on each magnet ring 723 becomes the in-phase magnetic poles, thus causing the rotor shunts to be rotated forward one set of magnetic poles. These two phases are repeated again and again to create continuous rotation.

Figure 16:
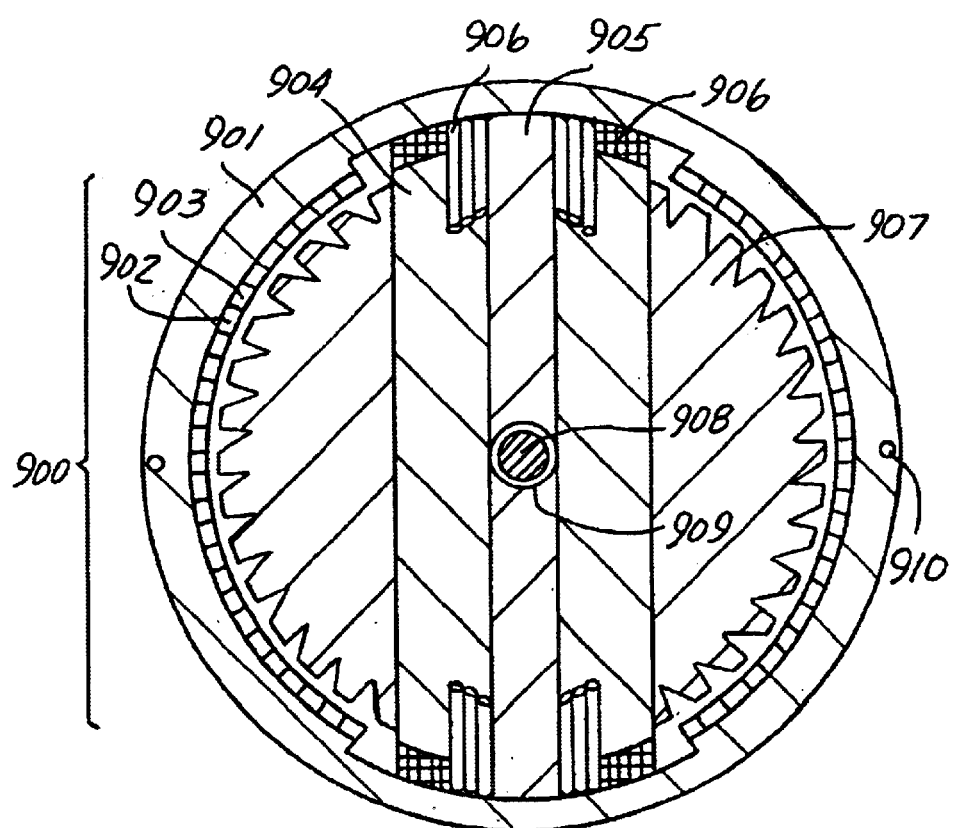
FIG. 16 is an elevational sectional view of another embodiment of the invention taken at right angles to the axis of rotor rotation illustrating the coil holder and the rotor located therebehind.
Figure 17:
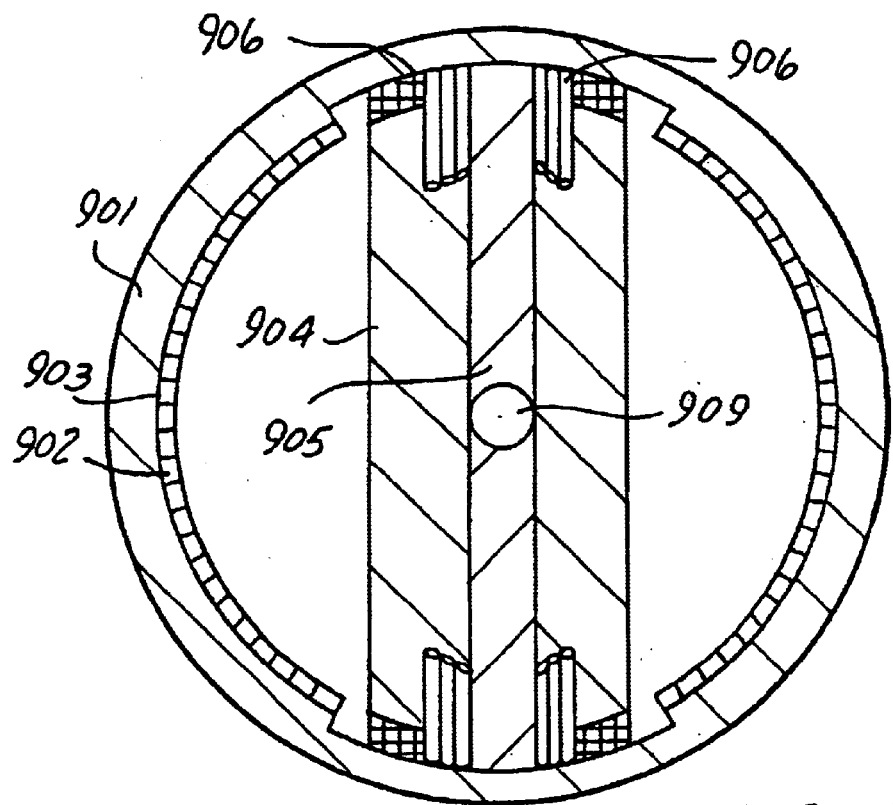
FIG. 17 is an elevational sectional view similar to FIG. 16 illustrating the coil holder, the rotor not being illustrated.
Figure 18:
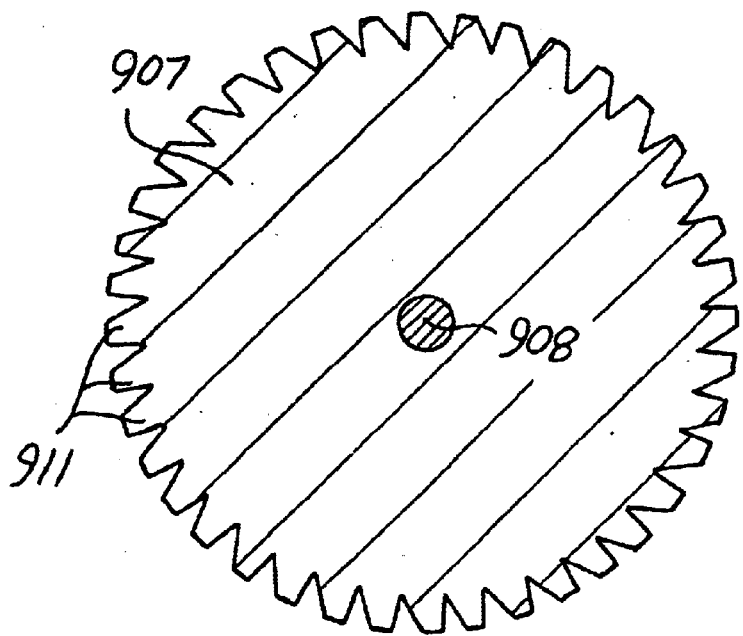
FIG. 18 is an elevational sectional view illustrating the rotor construction and its pole teeth.

Illustrated in FIG. 16 is an embodiment of motor 900. Motor 900 has a stator core 901 made of laminated motor iron. On the inside radius of the stator laminations are magnet pole sets 902 and 903. Every other magnet pole from the indicated magnet pole segment 902 is part of the set 902, and every other magnet pole from the indicated magnet pole segment 903 is part of the set 903. Magnet sets 902 and 903 have opposite polarity from one another. One face of each pole set is bonded to the inside radius of the stator 901 and the other pole-face is facing the work area between the resulting stator and the rotor. Coil holder and shaft-bearing holder 904 is made of an appropriate non-magnetic plastic, fiberglass or fiber board and has bearing 909 mounted in the raised area 905 so that it will hold rotor shaft 908 in place and will also mount to stator 901. Stator coil 906 is wrapped on either side of area 905 of coil and bearing holder 904. The rotor 907 is made of the same laminated motor iron as the stator 901. The rotor 907 rotates inside the coil and bearing holder 904 and the coil 906 and is held in place by the shaft and bearings mounted in coil holder 904, which is stationary. Thus, there are proper clearances between the coil holder 904 and the rotor 907. The poles (teeth) 911 of the rotor 907, as shown in FIG. 18, are so spaced and sized so as to line up with and cover the faces of the magnet pole faces of magnet set 902 or magnet set 903 alternately as it rotates. The stator coil 906 uses the stator laminations as the magnetic path for the flux flowing outside the coil 906 and is mounted to the stator 901 and is thus a true stator coil. This coil 906 does not move in relation to the stator magnet sets 902 and 903 and the stator magnet sets 902 and 903 do not move in relation to the stator coil 906 thus creating the true flux diode configuration.

When the stator coil 906 has positive voltage applied to it, the coil flux in the rotor 907 and in the stator laminations 901 will be in-phase with only one set of the magnet pole faces and will cause the flux from that set of magnet poles to go into series with the coil flux. This will cause the magnet flux and coil flux to both cause the poles of rotor 907 to be torqued into alignment with the in-phase set of magnet pole faces. When the stator coil 906 has negative voltage applied to it, the coil flux in the rotor 907 and in the stator laminations 901 will reverse and will then be in-phase only with the opposite set of magnet pole faces. This will result in the rotor poles of rotor 907 being torqued into alignment with this alternate set of poles. As can be seen, as the coil continues to alternate, the rotor will continue to rotate. Bearing 909 can be a one-way roller bearing on one side of the motor which will cause the rotor 907 to always start in the desired direction.

The coil 906 can have alternating current applied to it from a standard 60 cycle outlet (which will give a set RPM) or from a driving circuit which will provide whatever cycle and rotor speed desired.

The stator coil 906 can be divided into two coils and wrapped around the top and the bottom of the stator laminations 901 between the magnet faces. The coils are then activated so that they both produce the same field on the left side of the stator and the same field on the right side of the stator. Thus, the field produced by the two coils, being of the same polarity, can only shunt by using the rotor 907 and one of the magnet sets—whichever set is in phase with the flux of the coils. As the coils are then alternated, the same result as described above takes place and the rotor rotates in the same manner and for the same reasons. When this configuration is used for the stator coils, separate coil holders are used around the stator laminations and the bearing and shaft housing is mounted to the stator laminations horizontally so as to not interfere with the two coils at the top and bottom of the stator.

Another alteration to the preferred embodiment is to make the two surfaces of the inside radius of the stator laminations, where the magnet sets are bonded into poles. Two stator coils would then be wrapped behind the magnet sets on these poles. The coils would be activated so that they were always magnetically in-phase with each other as they alternate. The result is that the same flux diode effect is achieved and the rotor rotates for the same reasons as explained above.

From the above disclosure and the description of various embodiments of the invention, it will be appreciated that those skilled in the art may arrive at electric motors coming within the scope of the invention and it is intended that the invention be limited only by the scope of the following claims.

What is claimed is:

1. A radial flux diode motor, comprising:
   a stator having a coil coupled thereto;
   a permanent magnet assembly fixedly connected to said stator and having north and south poles of equal number and alternately spaced wherein said stator and said permanent magnet assembly do not move with respect to one another; and
   a rotor rotatably disposed within said stator and said permanent magnet assembly, and said rotor rotatably driven in response to positive and negative electrical phases applied to said coil so as to create a spinning, alternating magnetic field to said rotor, thereby causing said rotor to rotate due to magnetomechanical flux circuit forces acting on said rotor.

2. The radial flux diode motor stated in claim 1, further comprising:
   said stator having a first and second arcuate portion each having an inner periphery and a common radial axis;
   said permanent magnet assembly having a first and second arcuate portion connected to and coaxially aligned with said inner periphery of said first and second arcuate portions of said stator; and
   said rotor coaxially aligned with said first and second arcuate portions of said stator and said permanent magnet assembly.

3. The radial flux diode motor stated in claim 2, further comprising:
   said first and second arcuate portions of said stator and said permanent magnet assembly having at least one gap formed therebetween.

4. The radial flux diode motor stated in claim 2, further comprising:
   each of said first and second arcuate portions of said permanent magnet assembly having an even number of permanent magnets.

5. A radial flux diode motor, comprising:
   a stator having at least one coil coupled thereto and a first and second arcuate portion coaxially aligned;
   a first and second arcuate portion of a permanent magnet assembly coaxially aligned and connected to an inner periphery of said first and second arcuate portions of said stator, and said permanent magnet assembly having north and south poles of equal number and alternately spaced wherein said coil and said permanent magnet assembly do not move with respect to one another; and
   a rotor coaxially aligned and rotatably disposed within an inner periphery of said permanent magnet assembly, and said rotor rotatably driven in response to positive and negative electrical phases applied to said coil so as to create a spinning, alternating magnetic field to said rotor, thereby causing said rotor to rotate due to magnetomechanical flux circuit forces acting on said rotor.

6. The radial flux diode motor stated in claim 5, further comprising:

said first and second arcuate portions of said stator and said permanent magnet assembly having at least one gap formed therebetween.

7. The radial flux diode motor stated in claim 5, further comprising:

a shaft coaxially aligned with said rotor and having said rotor mounted thereon; and at least one bearing mounted on said shaft.

8. The radial flux diode motor stated in claim 7, wherein said at least one bearing further comprises:

a one-way bearing.

9. The radial flux diode motor stated in claim 5, further comprising:

said rotor having a plurality of teeth on an outer periphery of said rotor.

10. The radial flux diode motor stated in claim 9, further comprising:

said teeth having a sloped side to allow the rotor to rotate in a direction toward said sloped side.

11. The radial flux diode motor stated in claim 9, further comprising:

said teeth having a pair of opposing sides sloped toward one another to allow said rotor to be reversed.

12. The radial flux diode motor stated in claim 9, further comprising:

said teeth having a substantially rectangular profile.

13. The radial flux diode motor stated in claim 9, further comprising:

each of said teeth having an end wall for forming a magnetic pole, and said end wall having substantially 60% to 70% of the size of a magnetic pole of each permanent magnet of said permanent magnet assembly.

14. The radial flux diode motor stated in claim 5, further comprising:

an A/C power source coupled to said coil for applying A/C current to said coil.

15. The radial flux diode motor stated in claim 5, further comprising:

each of said first and second permanent magnet assemblies having an even number of permanent magnets.

* * * * *

UNITED STATES PATENT AND TRADEMARK OFFICE
CERTIFICATE OF CORRECTION

PATENT NO. : 6,853,110 B1
APPLICATION NO. : 10/202434
DATED : February 8, 2005
INVENTOR(S) : Durham et al.

It is certified that error appears in the above-identified patent and that said Letters Patent is hereby corrected as shown below:

On the Title Page, Item (57)

In the "Abstract," line 2, please insert the word --rotor-- after the word "rotatable;"

Column 2, line 42, please delete "rotator" and insert --rotor--;

Column 8, line 53, please delete "position" and insert --positioned--; and

Column 9, line 45, please delete "a" and insert --as--.

Signed and Sealed this

Eighteenth Day of September, 2007

JON W. DUDAS
*Director of the United States Patent and Trademark Office*